J. B. HYDE.

APPARATUS FOR APPLYING INSULATING MATERIAL TO ELECTRIC WIRES.

No. 10,404. Reissued Nov. 6, 1883.

WITNESSES
Edward E. Ellis
Geo. H. Harvey

INVENTOR
J. Burrows Hyde
per O. E. Duffy
Attorney

UNITED STATES PATENT OFFICE.

J. BURROWS HYDE, OF NEW YORK, N. Y.

APPARATUS FOR APPLYING INSULATING MATERIAL TO ELECTRIC WIRES.

SPECIFICATION forming part of Reissued Letters Patent No. 10,404, dated November 6, 1883.

Original No. 281,999, dated July 24, 1883. Application for reissue filed October 13, 1883.

DIVISION B.

*To all whom it may concern:*

Be it known that I, J. BURROWS HYDE, a citizen of the United States, residing at New York, in the county of New York and State of New York, have invented certain new and useful Improvements in Apparatus for Applying Insulating Material to Electric Wires, of which the following is a specification, reference being had to the accompanying drawings, in which is represented, at—

Figure 1:
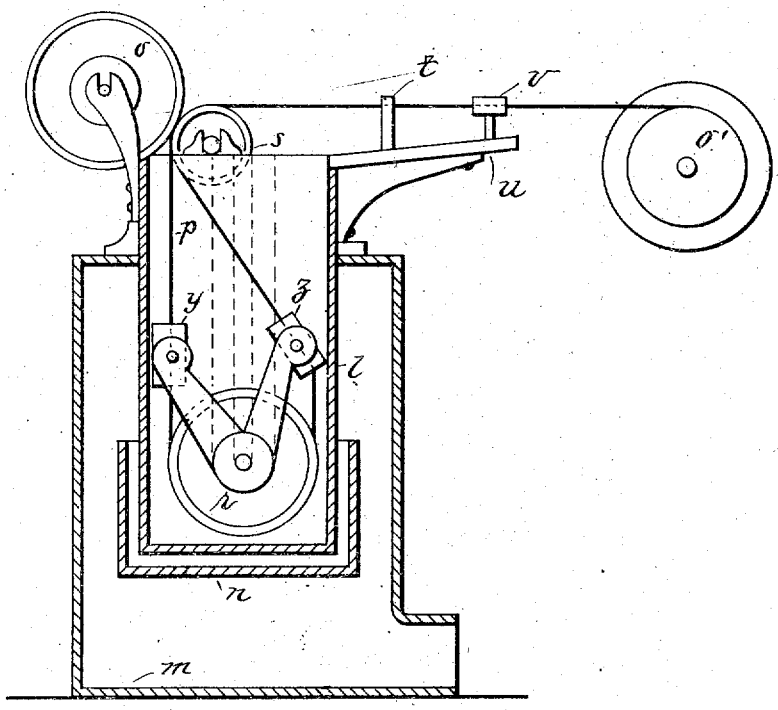
Figure 2:
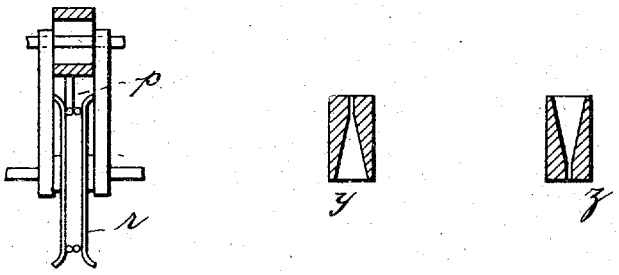

Figure 1, a vertical section of a molding apparatus, consisting of a kettle or tank of iron, *l*, suspended and fixed in a furnace, *m*, having a protecting shield or apron, *n*, to protect its bottom from intense heat. Fig. 2 represents several detail views.

In operating this apparatus the vessel *l* is kept about three-fourths full of insulating compound for application to the wires.

*o* shows a reel placed in brackets to rotate easily, and holding a thread-covered wire, *p*, that should pass readily through a uniform gage, which wire is passed around a wheel, *r*, at the bottom of *l*. Thence the wire passes upward and over a second pulley, *s*, at the top of the tank *l*; thence through a thin perforated plate, *t*, to strip off the excess of retained composition, the plate being fixed to a projecting apron, *u*; thence the wire passes through a conically-perforated gaging-die, *v*, also fixed to the apron *u*, from which it is coiled around a storing-reel, *o'*, placed at any proper distance to insure cooling of the composition before winding up; or it may be passed through a cooling-chamber.

The tank *l* is flat-sided, and made oblong, to permit the use of several distinct sets of the coating-fixtures placed nearly side by side on the same shaft, the different pulleys and reels having common rods on which they rotate, the pulleys *r* being arranged for easy removal from the tank with their attachments, the sustaining shaft or rod having bearings at its ends in a slotted plate fixed vertically on the ends inside the tank *l*, as shown by dotted lines.

The wheel *r*, being of thickness sufficient for a groove for the wire to pass at least twice around it, has its outer edges slightly flared outward, as shown at Fig. 2, the boss being thickened on each side correspondingly, and having on each side, but loose on the shaft, a V-shaped plate, to sustain at the ends of its arms conically-perforated metal blocks *y* and *z*, in reverse direction, to allow the wire to pass down and up, as shown, and induce more complete saturation of the thread-coating to the wire. In working, the tank *l* should be kept about three-fourths full of heated composition. It follows that the wheel *r* with its attachment will be constantly immersed in the composition while in a heated fluid state.

What I claim, and desire to secure by Letters Patent, is—

In the process of coating fiber-covered wire for electrical uses, the described apparatus, consisting of the tank *l*, with its submerged wheel *r*, attached arms and cones *y z*, in combination with the strip-plate *p*, gage-cone *v*, and reels *o o'*, when operated substantially as and for the purpose described.

In testimony whereof I affix my signature in presence of two witnesses.

J. BURROWS HYDE.

Witnesses:

B. F. MORSELL,

EDWARD E. ELLIS.